Oct. 12, 1954　　　　　E. K. BENEDEK　　　　　2,691,541
SHAFT BUSHING FOR MOUNTABLE MACHINE ELEMENTS
Filed Dec. 5, 1949　　　　　　　　　　　　　　5 Sheets-Sheet 1
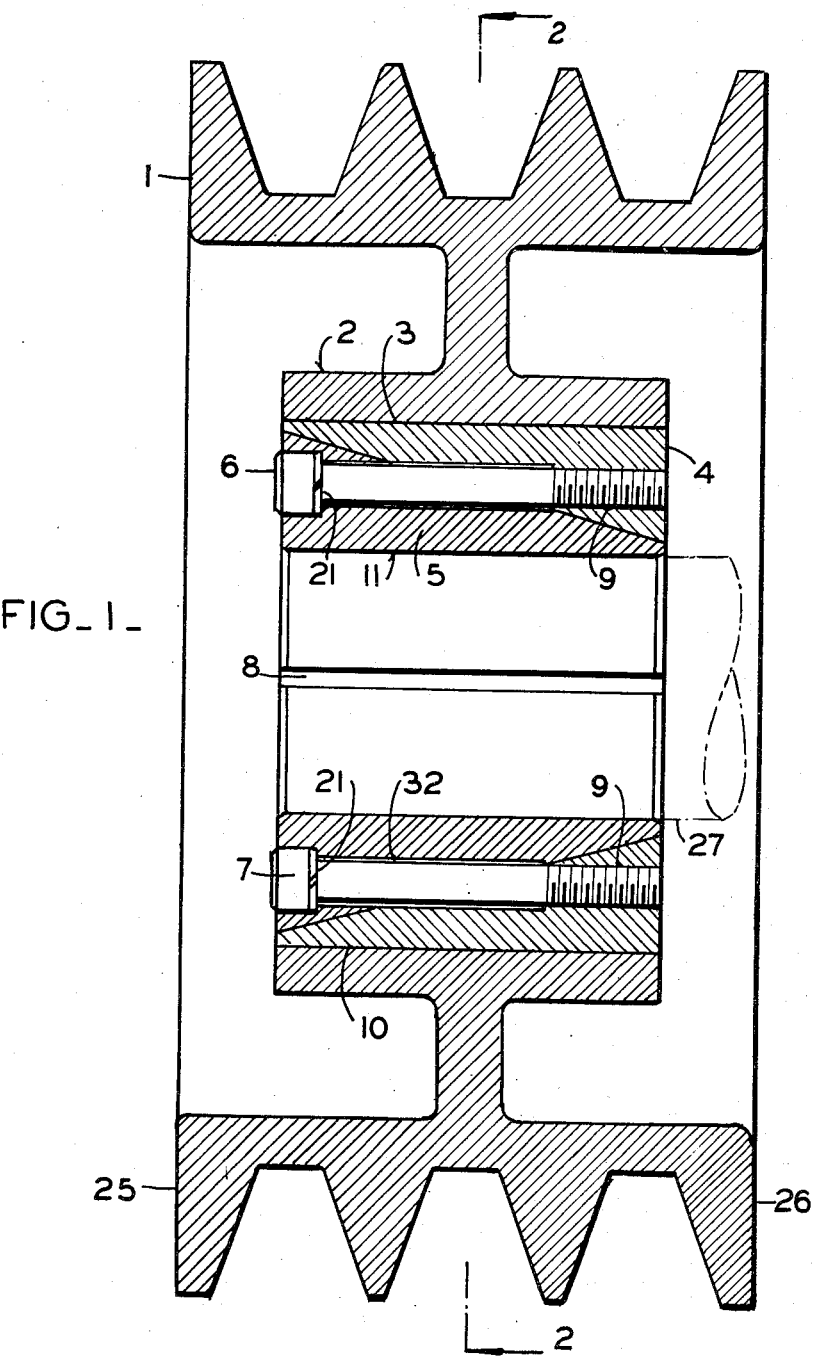
FIG_1_
INVENTOR.
ELEK_K_BENEDEK.
BY

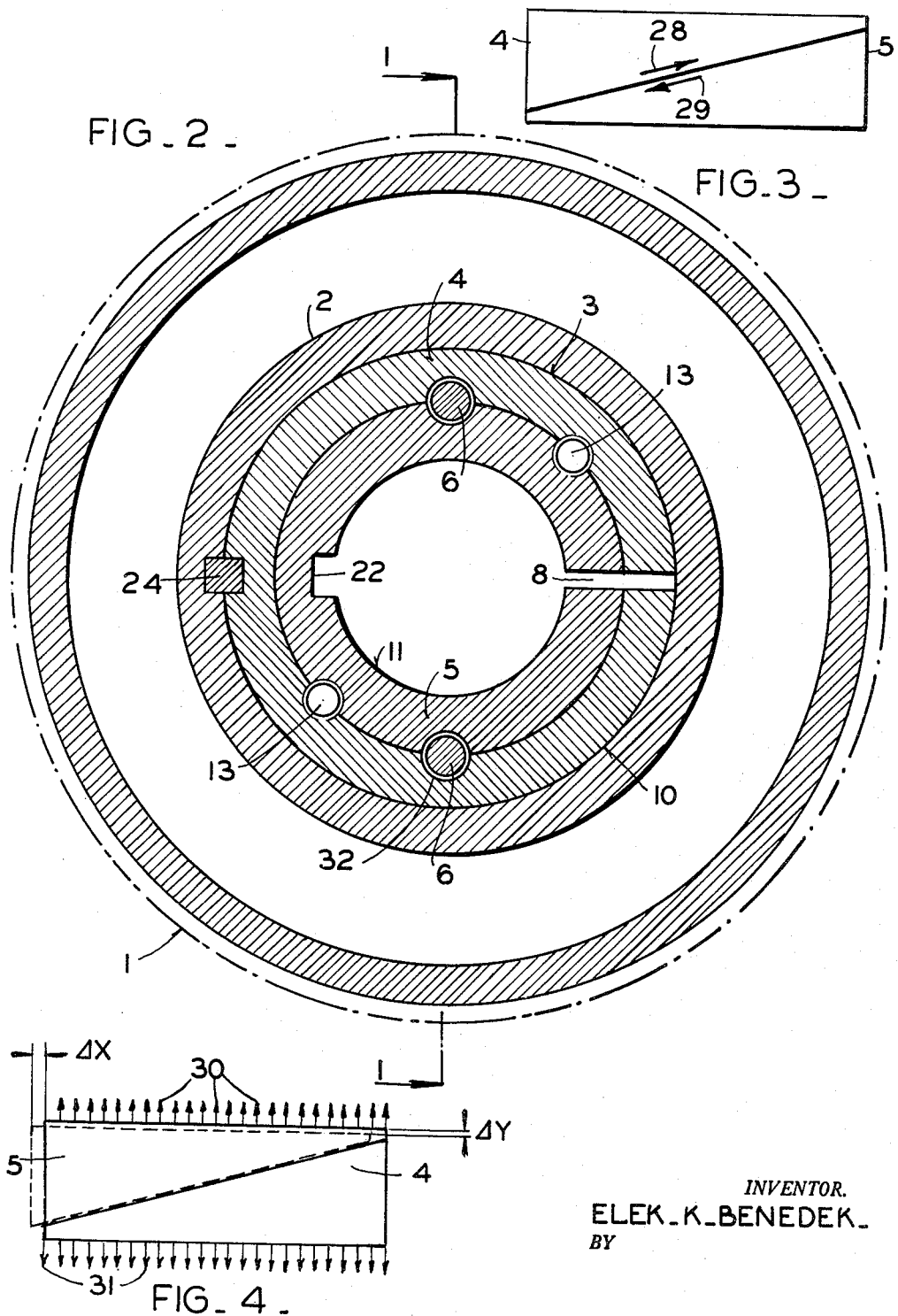

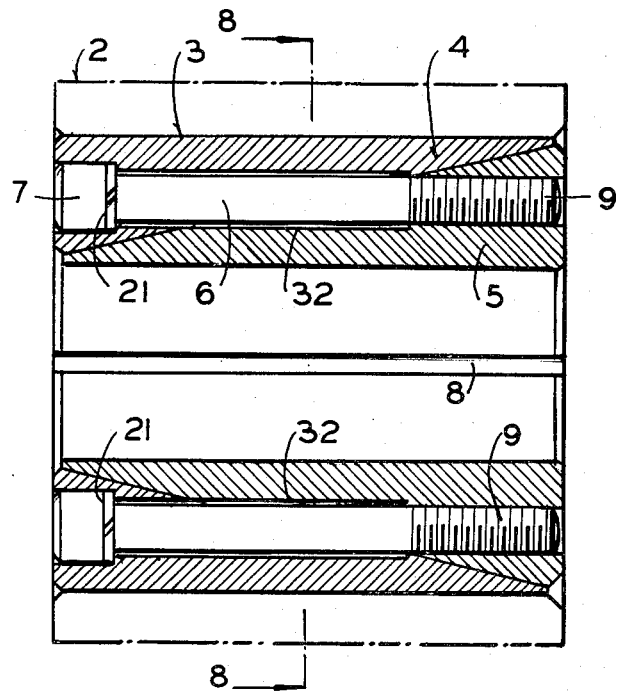
FIG_5_
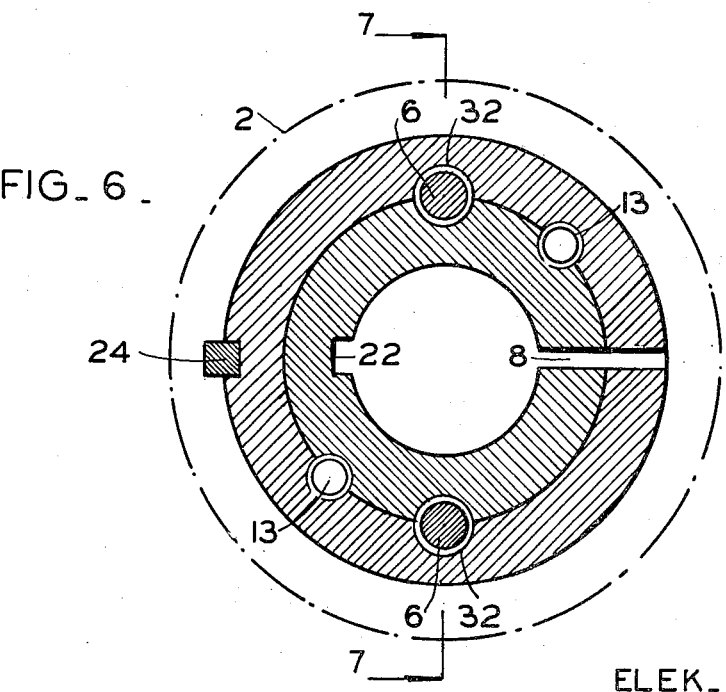
FIG_6_
INVENTOR.
ELEK_K_BENEDEK_
BY

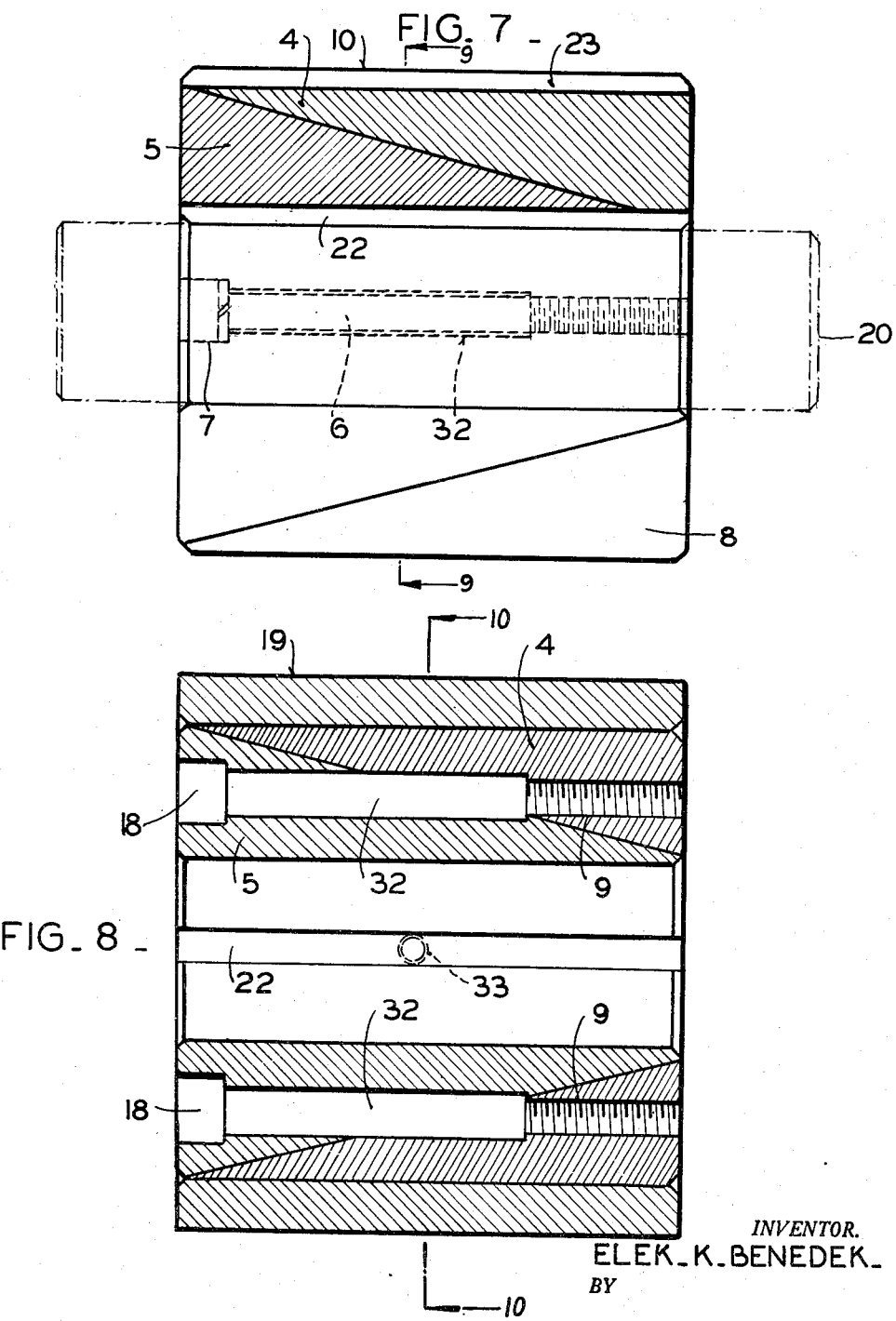

Oct. 12, 1954  E. K. BENEDEK  2,691,541
SHAFT BUSHING FOR MOUNTABLE MACHINE ELEMENTS
Filed Dec. 5, 1949  5 Sheets-Sheet 5

INVENTOR.
ELEK K. BENEDEK
BY

Patented Oct. 12, 1954

2,691,541

UNITED STATES PATENT OFFICE 2,691,541

SHAFT BUSHING FOR MOUNTABLE MACHINE ELEMENTS

Elek K. Benedek, Chicago, Ill.; Melba L. Benedek, administratrix of said Elek K. Benedek, deceased, assignor to Melba L. Benedek, individually Application December 5, 1949, Serial No. 131,119

2 Claims. (Cl. 287—52.06)

This invention relates to adjustable shaft bushings for mountable and retractable machine elements such as sheaves, pulleys, couplings, flywheels and the like, in which a machine element of the said character is mounted on a straight shaft in a fixed, rigid position by means of the bushing. The above machine elements are provided with a straight cylindrical hub and a straight cylindrical bore in said hub. The diameter of the straight hub bore being greater than the diameter of said shaft, for the purpose of the insertion of an adjustable bushing of this character.

Bushings of the present invention include one or a plurality of pairs of opposed tapered bushings or cones and cups, the arrangements being such that each pair of axially adjustable cone-cup assembly defines an adjustable bushing with straight inner and straight outer cylindrical surfaces. Therefore these types of bushings are mountable in the straight bores of sheaves, pulleys, couplings and like machine elements, thus eliminating cumbersone and expensive direct taper bores in the hubs of above said machine elements.

Built on a double wedge principle, the present invention has for its primary object the provision of a two-part simplified adjustable shaft bushing having inner and outer straight cylindrical surfaces, for the mounting of machine elements with cylindrical bores on straight commercial shafts.

Another important object lies in the provision of a self-contained two part adjustable bushing in which the working bearing surfaces will automatically become parallel to each other and thereby will mount the mountable unit with regard to a straight round shaft in absolutely normal or square position.

A further object is in the provision of an adjustable two part shaft bushing which easily can be adjusted upon the shaft or inside a straight bore of a mountable machine element and thereby having great practical utility for the mounting of such machine elements where the bore sizes vary in a great measure, and where machining tolerances are inconsistent with a rigid tight mounting of the said element upon a transmission shaft.

A further object lies in the provision of novel clamping means for pulling together the two working elements of my novel two part bushing, and thereby simultaneously tightening and gripping the shaft and the straight bore of the mountable machine element with respect to each other by the way of the said bushing.

A further object lies in the provision of effective clamping means for my two part adjustable shaft bushing, whereby upon the tightening of said clamping means the two parts of said bushing will simultaneously expand and contract respectively in such a manner that the cone will be contracted inwardly and the cup will be expanded outwardly forming substantially parallel working bearing surfaces for the coacting shaft and mountable hub bore respectively.

A further object lies in the provision of an economical design for an adjustable shaft bushing whereby the bushing will be adjustable inwardly and outwardly, and in a direction normal to the axis of the shaft and mountable hub respectively, and thereby eliminate flanges and axial instrumentalities for the tightening of the bushing between said shaft and said hub bore.

A further object lies in the creation of a new and useful bushing means which is easy to be installed and removed from its assembly, and which has a straight outside and a straight inside parallel cylindrical surface in all adjusted positions of the bushing.

A further object lies in the provision of simplified retracting means for the parts of the bushing, preferably such retracting means which are interchangeable wtih the clamping means thereof.

A further object of this invention lies in the provision of a novel process for making the parts and finishing the machining in a consistent practical order and thus lowering the cost of production and assembly to a practical minimum.

Further and more specific objects will be evident from the following description of three illustrative embodiments of the present invention.

In the accompanying drawings:

Fig. 1 is a longitudinal main section of a multiple groove pulley taken on line I—I of Fig. 2, showing the application of the invention in the hub of the pulley.

Fig. 2 is a transverse section taken on line 2—2 in Fig. 1.

Fig. 3 is a diagram of the duplex wedge principle, showing the operation of the present invention.

Fig. 4 is a working diagram of the duplex wedge principle, showing the radial expansion and the radial contraction of the wedges during the operation of the present invention.

Fig. 5 and Fig. 6 are longitudinal and transverse main sections respectively, showing one embodiment of the present invention.

Fig. 7 is a longitudinal section of the bushings of the present invention showing one phase of the process of manufacture of the present invention.

Fig. 8 is a longitudinal section of the bushings showing another step of the process of manufacture of the present invention.

Figure 9:
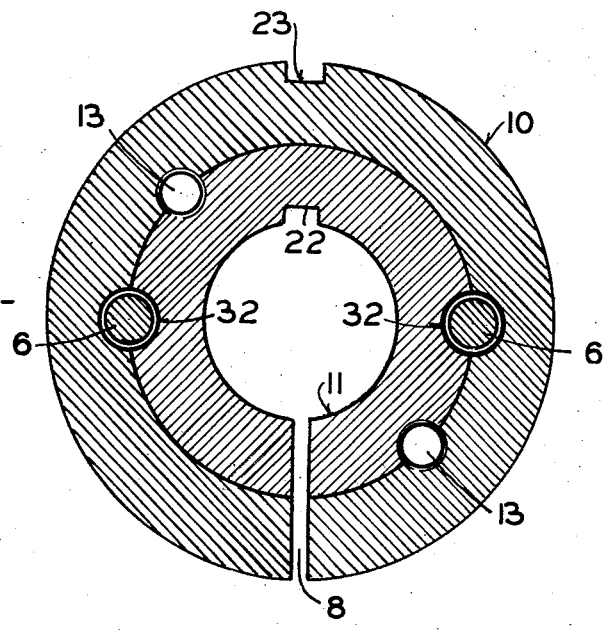
Fig. 9 is a transverse section taken on line 9—9 in Fig. 7.

Referring now to the drawings, including Figs. 1 to 4, Fig. 1 shows the application of this invention in combination with the mounting of a sheave or pulley 1 on a straight shaft. It can be used, however, in any combination of a straight shaft and a mountable power transmission machine element, such as shaft couplings, clutches, sprockets, etc. Pulley 1 is provided with a cylindrical hub 2 and a straight bore 3 therein, the hub 2 and bore 3 being concentric and normal to the geometrical axis of the sheave or pulley 1. The boring operation of straight bore 3 is relatively simple and accurate when compared to a boring operation of a tapered bore. After the two parallel side walls 25 and 26 of the machined elements are established, a straight bore normal to these two basic surfaces 25 and 26 is relatively simple and accurate. The concentricity will be established with regard to the finished outside diameter of the pulley 1.

The combination of a cup shaped tapered bushing 4 with a cone shaped tapered bushing 5 by means of clamping cap screws 6—6 constitutes an adjustable straight shaft bushing, with outside straight cylindrical surface 10 and inside straight cylindrical bore 11. Both bushing halves 4 and 5 are split as at 8, and therefore when cap screws 6—6 are inserted in screw holes 9—9 and tightened against the shoulders of counterbores 18—18, the heads 7—7 of cap screws 6—6 will pull the cup 4 and cone 5 axially together with an amount of $\Delta x$, as shown in Fig. 4. Upon the axial movements of the cup and cone with an amount $\Delta x$, and in the direction of arrows 28 and 29, the outer and inner straight cylindrical surfaces 10 and 11 of the cup 4 and cone 5 will move outwardly and inwardly by a translatory movement in the direction of the small arrows 30 and 31 as shown in Fig. 4, with a total amount of $\Delta y$. Since the shaft 27 is straight and cylindrical, and the hub bore 3 is straight and cylindrical, the outside and inside surfaces 10 and 11 of cup and cone 4 and 5 will also remain parallel with each other and with the shaft and concentric bore 3 in any adjusted position of the bushing assembly 4—5, as shown in Fig. 4.

The design is such, as shown in Fig. 1, that by pulling closer and closer together the cap screws 6—6, the cup 4 and cone 5 will move, simultaneously, axially and radially with the coordinated amounts of $\Delta x$ and $\Delta y$, respectively, until after the expansible cup 4 will grab the straight hub bore 3 of hub 2, and contractible cone 5 will grab straight shaft 27 with the predetermined amount of grip, due to the split 8 in both of the coacting bushing halves 4 and 5. The distribution of mounting forces are shown by small arrows 30 and 31; they are opposed to each other and in perfect mechanical balance radially. The frictional forces in the tapered coacting surfaces or frusta 12—12 of the cup and cone 4 and 5 are also opposed and in perfect mechanical balance axially. These axial forces are caused by the pulling forces of cap screws 6—6 against the cup 4 and cone 5 respectively, and transmitted to the cone 5 by screw heads 7—7 and to the cup 4 by screw holes 9—9. The screws 6—6 are locked up in their tightened operative positions by appropriate lock washers as at 21—21.

For the retraction of the bushing assembly 4—5—6, I provided a pair of retracting screw holes as at 13—13 in one of the bushing halves 4 or 5, and a pair of retracting screws 14—14 which may be cap screws 6—6 themselves, since at the dismounting of the bushing working cap screws 6—6 will be taken out from screw holes 9—9 and inserted directly to retracting screw holes 13—13 for retracting.

The embodiment shown in Fig. 5 and Fig. 6 is the same as the one shown in assembled position in Fig. 1, in combination with a multiple V-belt pulley. In this embodiment of Fig. 5 and Fig. 6 the cap screws 6—6 may be used in combination with retracting screw holes 13—13 for retracting the bushing from its assembly with a shaft mountable machine element or pulley 1. The unthreaded portions of cap screws 6—6 are located in one of the unthreaded holes 32—32 of one of the bushing halves 4 or 5, while their threaded portions are engaged by threaded screw holes 9—9 of the other of said cup and cone 4 and 5. The unthreaded holes 32—32 for cap screws 6—6 are larger in diameter than the diameter of the cap screws 6—6 in order to facilitate free sliding motion of the coacting tapered frusta or conical surfaces 12—12 of the cone and cup respectively.

The coacting tapered surfaces or frusta 12—12 may be lubricated or provided with Alemite grease lubricating cups for easy and effective adjustment, assembly or disassembly of the diagonal surfaces 12—12. Such oil or grease will prevent the surface from locking when high pressure between 12—12 may cause molecular adhesion between the molecules of the closely fitting diagonals of the cup and cone 4 and 5 respectively.

As shown in Fig. 5 and Fig. 6, the machining and the disposition of an inner keyway 22 and an outer keyway 23 for keys 24—24 become easy now, with the straight cylindrical bore 11 in the cone 5 and the straight cylindrical surface 10 in the outer bushing half or cup 4. Also, an important improvement over the conventional taper locks lies in the facility by which the straight cylindrical bushing assembly 4 and 5 and hub bore 3 can be precision machined and controlled against a conventional tapered bore in a large pulley, the general machining and dimensions of which are practically speaking rough and inaccurate. A straight hub bore 3 in any pulley 1 is, however, a conventional and easy operation, and it is straight, thus increasing the overall precision of the pulley by being more accurate and concentric to the rest of the pulley. Under all conditions the finish and accurate taper in a large pulley is a considerable extra cost over the straight and conventional straight bore. Ordinarily the clamping means are also secured to the hub 2 of the large pulley 1, in a conventional design, which also adds considerable cost and inaccuracies to the overall machining of the pulleys. This is because it is expensive to set up a large pulley for close machining, even if fixtures and good machine tools are available. It is to be further noted that the present construction permits the maintenance of an inventory of a supply of bushings per se rather than a large number of the more expensive pulleys.

*Process of manufacture*

Figure 10:
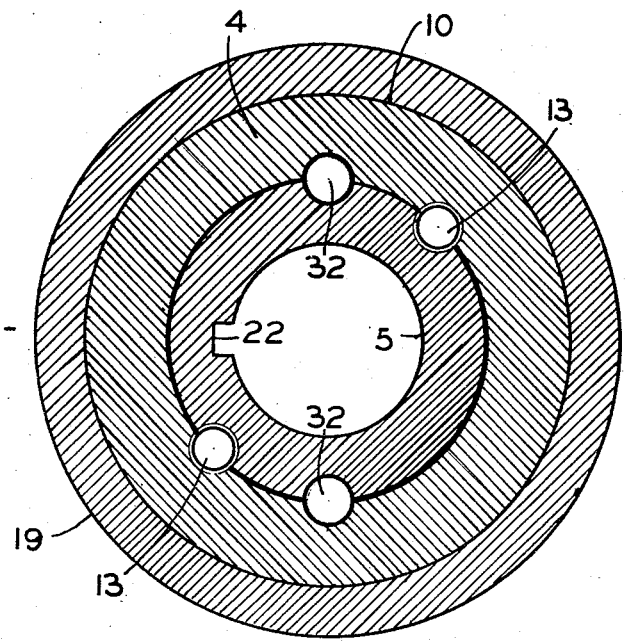
Fig. 10 is a transverse section taken on line 10—10 of Fig. 8.

Fig. 8 and Fig. 10 illustrate one specific phase of the process of manufacture of this invention, namely, the process of boring of holes 32—32, and the tapping of screw holes 9—9. After the finish machining of the straight cylindrical surfaces 10 and 11, and the tapered or diagonal surface 12, but before splitting the halves 4 and 5, the halves 4 and 5 can be press fitted into a solid sleeve-like fixture as at 19, and by being locked in fixture 19 like a one piece body they will be tap drilled in one setting for screw holes 9—9, counterbores 18—18 for screws 6—6 and screw heads 7—7 respectively, as shown in Fig. 8. After the threaded and unthreaded screw holes 9—9 and 32—32 are finished in fixture 19, cap screws 6—6 may be inserted in Fig. 8, the clamping fixture 19 removed, and the secured assembly may now be assembled on arbor 29 and outer keyway 23 and split-cut 8 be executed as shown in Fig. 7 and Fig. 9.

In operation, as was already mentioned in connection with Figs. 3 and 4, the bores 10 and diameters 11 are always concentric with each other and with at least one of the mountable elements 2 or 27. The locking forces which are the resultants of evenly distributed forces indicated by the arrows as at 30 and 31 respectively, of Fig. 4, are always normal to the axis of shaft 27 and their line of action is substantially in the mid portion of the bushing assembly as in line 2—2 of Fig. 1. The axial or clamping forces set up by clamping means 6—6 are also in perfect axial balance and are acting in the bolt circle of the assembly 4—5 of each embodiment.

Contrary to this axial balance of locking and clamping forces, the conventional taper lock contains only one bushing, tapered in one direction. This unidirectional tapered bushing is in coaction with the mating rigid taper of the solid tapered hub and is apt to get loose under the one directional clamping forces set up as a result of the axial components of the locking forces, and also as a result of lateral forces and vibrations imposed upon the pulley of the multiple V-belt drive. These V-belts vibrate not only in their planes but also laterally to their planes. Such lateral vibrations are apt to loosen the mounting of the conventional unidirectionally tapered bushing in its tapered hub unless the length of the hub and the clamping bolts are made extra heavy, heavier than the clamping means of this invention, and means more costly and heavier equipment. Additionally, the tapered bore in a large sheave or pulley is very costly to make. The set up and adjustment of the taper attachment is an expensive and time wasting operation. Finally, conventional machine tools do not have such taper attachments as standard equipment, but need extra expensive taper attachments for this purpose. Boring machines also need skillful machine-tool operators. The pulleys are quite often so large in size that it takes several men to handle the setup, and with the increased size of tapered holes the amount of machining error and tolerances will grow in direct proportion.

In the machining and production of the two-part bushing 4 and 5 of the present invention, on the contrary, the bushing halves are made out of small stock sizes and finished on automatic or semi-automatic conventional machine tools. A straight bore as at 3 is, on the other hand, machined directly on standard machine tools and without expensive and difficult taper fixtures, without loss of time as far as the machine elements themselves are concerned. As far as the two-part bushing itself is concerned, it is made of small parts, machined as hereinabove was described on production screw or hydraulic machine tools, in large quantities and lots, at very low cost.

The method of production is subject to some variations due to various sizes and requirements for the adoption of my bushing. While I prefer to make smaller sizes out of tubular stock material, larger sizes may be made out of castings or forgings of good semi-steel or nickel iron or steel. The smallest sizes may be made by die casting or injection molding processes, since zinc or aluminum are sufficiently strong for the low torque and small horse-power to be transmitted by the small bushings.

Similarly, the angle of taper may vary to suit conditions, and may be between 10° and 15° on the side, depending on the thickness and length of the bushings. For reason of economy, both of these dimensions are kept to a practical minimum, except where standardization prefixes certain dimensions otherwise.

The assembly usually includes an inner and an outer key 24—24 and keyway 22 and 23 for connecting the shaft 27 and the hub 2 for torque transmission or driving and driven relation with the bushing.

The structures described may be variously modified as to details to suit different requirements and conditions, and it is not indispensable to use all the features of the invention conjointly, since different features thereof may be advantageously used in various combinations and assemblies.

The term hub as used in the specifications and claims denotes the hub of a machine element or device to be mounted on a shaft or such element, as a whole, having a straight cylindrical hub bore.

I claim:

1. A shaft mountable machine element including a cylindrical hub portion, a bore in said cylindrical hub portion, a shaft in said hub bore in concentric radially spaced relation thereto, a two part cylindrical straight bushing operatively interposed between said shaft and said hub bore for mounting said machine element upon said shaft, said two part bushing including an inner cone shaped member and an outer cup shaped member, said members being split axially and having complementary mating surfaces, and means for clamping said members together to thereby tighten said inner member against the shaft and said outer member against the hub, said clamping means including a plurality of circumferentially spaced clamping screws and coacting screw holes in said members for tightening the same, said screws being carried by one and operated by the other of said members.

2. A shaft mountable machine element including a cylindrical hub portion, a straight bore in said cylindrical hub portion, a shaft in said hub bore in concentric radially spaced relation thereto, a two part cylindrical straight bushing assembly operatively interposed between said shaft and said hub for mounting said machine element upon said shaft, said two part bushing including an inner cone shaped member and an outer cup shaped member, said members being split axially and having complementary mating surfaces, and means for clamping said members together, said means including a plurality of circumferentially spaced cap screws carried by one and actuated by the other of said members, and means for securing said cap screws in their locked operating positions.

(References on following page)

References Cited in the file of this patent

UNITED STATES PATENTS

| Number | Name | Date |
|---|---|---|
| 525,775 | Wainwright | Sept. 11, 1894 |
| 827,346 | Bubb | July 31, 1906 |
| 929,762 | Hess | Aug. 3, 1909 |
| 1,045,984 | King | Dec. 3, 1912 |
| 1,201,706 | Dodge | Oct. 17, 1916 |
| 1,251,449 | Vorraber | Dec. 25, 1917 |
| 1,371,828 | Walbert | Mar. 15, 1921 |
| 1,758,182 | Strong | May 13, 1930 |
| 1,771,769 | Brunner | July 29, 1930 |
| 2,366,668 | Heim | Jan. 2, 1945 |
| 2,460,631 | Fawick | Feb. 1, 1949 |
| 2,480,114 | Bradbury | Aug. 30, 1949 |

FOREIGN PATENTS

| Number | Country | Date |
|---|---|---|
| 52,833 | Sweden | of 1920 |